US006880148B1

(12) United States Patent
Raph et al.

(10) Patent No.: US 6,880,148 B1
(45) Date of Patent: Apr. 12, 2005

(54) ACTIVE DATA TYPE VARIABLE FOR USE IN SOFTWARE ROUTINES THAT FACILITATES CUSTOMIZATION OF SOFTWARE ROUTINES AND EFFICIENT TRIGGERING OF VARIABLE PROCESSING

(75) Inventors: Darvin Dale Raph, Loveland, CO (US); Thomas Robert Fay, Ft Collins, CO (US)

(73) Assignee: Agilent Technologies, Inc., Palo Alto, CA (US)

( * ) Notice: Subject to any disclaimer, the term of this patent is extended or adjusted under 35 U.S.C. 154(b) by 476 days.

(21) Appl. No.: 09/618,710

(22) Filed: Jul. 18, 2000

(51) Int. Cl.$^7$ ............................................. G06F 9/44
(52) U.S. Cl. .................................... 717/124; 717/114
(58) Field of Search ............................... 717/114, 124, 717/126, 130

(56) References Cited

U.S. PATENT DOCUMENTS

| | | | | | |
|---|---|---|---|---|---|
| 4,819,234 | A | * | 4/1989 | Huber | 717/129 |
| 5,313,616 | A | * | 5/1994 | Cline et al. | 717/127 |
| 5,504,881 | A | * | 4/1996 | Sirurget | 714/38 |
| 5,938,781 | A | * | 8/1999 | Proskauer | 714/724 |
| 6,085,029 | A | * | 7/2000 | Kolawa et al. | 714/38 |
| 6,249,882 | B1 | * | 6/2001 | Testardi | 714/38 |
| 6,263,491 | B1 | * | 7/2001 | Hunt | 717/130 |
| 6,385,552 | B1 | * | 5/2002 | Snyder | 702/123 |
| 6,401,220 | B1 | * | 6/2002 | Grey et al. | 714/33 |

OTHER PUBLICATIONS

Evans, James R., Lisonbee, James C., Allred, Lloyd G., "Using Windows Messaging to Control Automatic Test Equipment", 1999, p. 147–149, retrieved from IEEE database Feb. 20, 2003.*

Meier, Michael S., Miller, Kevan L., Pazel, Donald P., Rao, Josyula R., and Russell, James R., "Experiences with Building Distributed Debuggers", 1996, ACM p. 70–79, retrieved from ACM Portal database Feb. 20, 2003.*

Prins, Jan F., "Automated Testing in aAPL—An Application of Exception Handling", 1982 ACM, p. 260–264, retrieved from ACM database Feb. 20, 2003.*

"Memory Parity Check Resume", 1991, SPI Database, IBM TDB, retrieved from SPI database Feb. 20, 2003.*

\* cited by examiner

*Primary Examiner*—Wei Y. Zhen
*Assistant Examiner*—Mary Steelman

(57) ABSTRACT

The present invention provides an active data type for use in a computer program. The active data type has an identifier and at least one algorithm associated therewith. The identifier is utilized by the computer program to identify the instance of the active data type. The algorithm is configured to be automatically executed when an attempt to access a value associated with the active data type instance is made by a routine or otherwise. When a particular routine that uses an instance of the active data type attempts to access the value associated with the active data type, the algorithm determines the value associated with the active data type before the routine obtains access to the value. The active data type may be a real, an integer, or a string, for example. The algorithm automatically determines the current value associated with the active data type instance. Preferably, the active data type has an identifier, a first algorithm and a second algorithm associated therewith. The first algorithm preferably automatically determines the current value of the instance of the active data type when a routine that utilizes the value of the active data type instance attempts to access the value. When the value of the instance of the active data type is set, the second algorithm preferably automatically post-processes the value to which the active data type instance has been set. A locking/unlocking mechanism sets the value of the active data type instance prior to the first algorithm invoking the particular routine, suspends active data type algorithm processing while the routine executes, and processes the value of the active data type instance using the second algorithm once the routine has returned in order to post-process any changes to the value of the active data type instance.

15 Claims, 4 Drawing Sheets

Format | Fixed characters and a parameter = %Parm1%

Parameter

| Name | Value |
|------|-------|
| Parm1 | 5 |

FIG. 2

New String Value | Some characters and a parameter = 99

Format | Some characters and a parameter = %Parm1%

Parameter

| Name | Value |
|------|-------|
| Parm1 | 99 |

FIG. 3

ACTIVE DATA TYPE VARIABLE FOR USE IN SOFTWARE ROUTINES THAT FACILITATES CUSTOMIZATION OF SOFTWARE ROUTINES AND EFFICIENT TRIGGERING OF VARIABLE PROCESSING

TECHNICAL FIELD OF THE INVENTION

The present invention relates to an active data type and, more particularly, to an active data type used as a variable in a computer program that enables software routines to be augmented by providing a systematic technique for adding algorithmic processing to the data passed to or retrieved from those routines. In general, the present invention enables stand-alone, active data type variables to be defined as having values that are algorithmically calculated or determined when those variables are read and/or set. The active data type variable enables software routines to be easily customized and for the customized routines to be reusable. Furthermore, processing of the active data type variable is efficiently performed because processing preferably is only triggered when the values associated with the variable are read and/or set.

BACKGROUND OF THE INVENTION

The desire to make use of existing or new software routines for new applications is not new. Nearly every programming language, including C++, VISUAL-BASIC™, AGILENT-VEE™, and LABVIEW™ provide capabilities to invoke such routines. The routines themselves may be cast in a dynamically linked library form, an ACTIVE-X™ component form, a CORBA™ component form, or a variety of others. The languages can be used to customize or fit the routines to be reused as needed. The customization cannot be extended across reuse instances of the customized routines. Furthermore, these solutions all require a considerable amount of programming skill to use effectively, and frequently require that a "wrapper" routine be written in the programming language in order to cast the original routine in a new role as a new routine ready to reuse.

Computer programs used to verify the integrity of electrical circuits, such as, for example, TEST-EXECUTIVE™ from DIT-MCO International Corporation, TEST-STAND™ from National Instruments Corporation, and TEST-EXEC™ from Hewlett-Packard Company, are computer programs designed to enable users to reuse test and measurement software routines to create test programs and manage the testing operation. Computer programs used to verify the integrity of electrical circuits frequently provide language-like features that enable customization of the operation of those routines. However, like general purpose programming languages, they do not provide ways to systematically customize the operation of those routines across a number of reuse instances. To do this requires the same style of "wrapper" routines mentioned above, which are usually performed using a general-purpose language, such as those mentioned above, for example. This type of customization typically must be performed outside of the computer program development environment, and hence can be cumbersome.

As is generally known in computer programming, sometimes processing must be performed whenever the value of a variable changes. In most applications, this is accomplished by periodically checking for a new value in that variable and performing whatever processing is required when a new value is detected. This technique can be quite inefficient, especially in cases where the value changes infrequently and processing must be done quickly after a change is detected. In such cases, the value must be checked quite frequently and most checks correspond to wasted processing. Being able to trigger the processing at the point of change in the value of that variable would be more efficient, but doing so is not easily accomplished using existing solutions.

Accordingly, a need exists for an active data type that functions as a variable and that enables software routines to be easily customized. Furthermore, a need also exists for such an active data type that causes processing of the variable to be triggered in an efficient manner.

SUMMARY OF THE INVENTION

The present invention provides an active data type for use in a computer program. The active data type has an identifier and at least one algorithm associated therewith. The identifier is utilized by the computer program to identify an instance of the active data type. The algorithm is configured to be automatically executed when an attempt is made to access a value associated with an instance of the active data type. The active data type may be a real, an integer, or a string, for example.

When the attempt to access the value associated with the active data type is made by a particular routine, the algorithm is automatically executed, which preferably determines the current value associated with the active data type instance. Preferably, the active data type has an identifier, a first algorithm and a second algorithm associated therewith. The first algorithm preferably automatically determines the current value of the instance of the active data type when a routine that utilizes the value of the active data type instance attempts to access the value. When the value of the instance of the active data type is set, the second algorithm preferably automatically post-processes the value to which the active data type instance has been set.

Preferably, a locking/unlocking mechanism is provided that locks the value of the active data type instance prior to invoking the particular routine and unlocks the value of the active data type instance once the routine has returned in order to allow a new value of the active data type instance to be set. By locking the value of the active data type instance when the routine is invoked and by unlocking the value when the routine returns, intermediate values generated by the routine are not set. Only the final value generated by the routine is set once the routine returns.

The present invention also relates to an apparatus for executing a computer program utilizing the active data type and to a method for utilizing the active data type in a computer program. These and other aspects and features of the present invention will become apparent from the following description, drawings and claims.

BRIEF DESCRIPTION OF THE DRAWINGS

FIG. 2 is a block diagram demonstrating the manner in which the active data type of the present invention may be used in conjunction with format strings.

FIG. 3 is a block diagram demonstrating the manner in which the active data type of the present invention may be used in conjunction with a string format wherein the values of symbols and parameters used in the string format may be set based upon a new string value extracted from a string format.

DETAILED DESCRIPTION OF THE INVENTION

As will be seen from the following discussion, the active data type of the present invention enables the behavior of existing software routines to be customized in such a manner that the customized routine itself is capable of being reused, and the customization is extendable across instances of the customized routine. The active data type enables variable values to be algorithmically defined such that users of a particular active data type variable need not be aware of or concerned about the algorithm being invoked. This algorithmic definition is generated with the latest possible binding of the variable value, in that the value is calculated at the point of access. The present invention also enables algorithmic post-processing of the value of a variable to be triggered by variable value changes. This represents the earliest possible binding for post-processing the value as it is set. In addition, the present invention enables a parameterized general algorithm to be associated with the active data type for algorithmic processing of the active data type. All of these features of the present invention provide a technique for controlling how often the algorithmic processing associated with an active data type variable is performed.

The active data type variable of the present invention is useful for implementation with various types of the aforementioned computer programs used to verify the integrity of electrical circuits. Such computer programs are typically used by customers who have a body of existing test and measurement routines that they wish to make use of within the test environment. Other data-intensive environments, such as databases and spreadsheets, for example, may be other good application areas for the present invention. Those skilled in the art will understand, in light of this disclosure, that the present invention is not limited to these practical applications. Those skilled in the art will understand that the present invention will have significant practical uses in virtually an infinite number of computer-related environments, either currently known or developed in the future. However, for purposes of illustration, the present invention will be discussed with reference to its use in a test environment for testing instruments and obtaining test measurement data.

Figure 1:
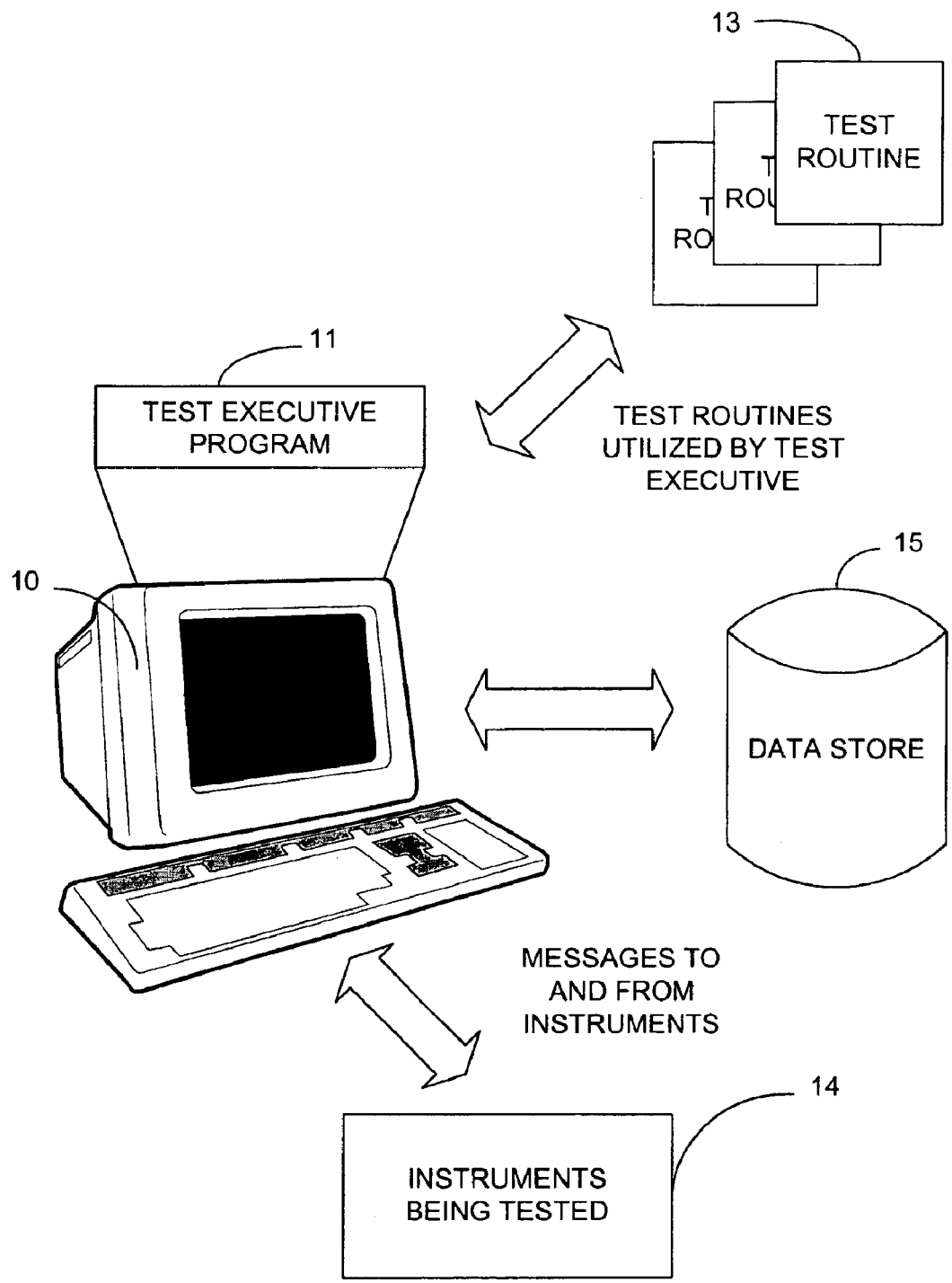
FIG. 1 is a block diagram demonstrating the manner in which the present invention may be implemented in a test environment where test routines are utilized in conjunction with a computer program to test various types of instruments.

FIG. 1 demonstrates a test environment in which the active data type variable of the present invention may be utilized with test routines in order to test instruments. A computer 10 executes a computer program 11 for verifying the integrity of electrical circuits. The computer program 11 performs various test routines 13 that are used to control various types of instruments, which are collectively referred to by block 14. The computer 10 is in communication with the data store 15 to enable the computer 10 to retrieve data from and store data in data store 15 associated with the execution of the computer program 11 and the various test routines 13. Those skilled in the art will understand that the data store might be a database, a collection of files, or other forms of data repositories. The manner in which the test environment illustrated in FIG. 1 can be implemented is known to those skilled in the art. The following discussion describes the active data type variable of the present invention and the manner in which it can be utilized in the test environment shown in FIG. 1.

As stated above, in accordance with the present invention, the test routines 13 can be customized utilizing the active data type techniques of the present invention and the customized test routines, and instances thereof, can be reused. The test routines 13 preferably are stored in the data store 15 and invoked by the computer program 11 when the computer 10 receives instructions from a user via the console of the computer 10. Therefore, the active datatype variables themselves and the test routines in which they are utilized are stored on some type of computer-readable storage device. Of course, the present invention is not limited with respect to the type of computer-readable storage device that is utilized for this purpose. Those skilled in the art will understand that a suitable storage device for such a purpose may be, for example, a magnetic storage medium, an optical storage medium, a solid state storage medium, or any other type of storage medium known now or developed in the future. The computer 10 comprises hardware or hardware and software for performing the associated tasks. These tasks include execution of the computer program 11, execution of one or more test routines 13, customization of one or more of the test routines 13 in accordance with user input via the console of the computer 10, accessing the data store 15 and sending/receiving messages to and from the instruments 14 being tested.

One specific useful application of the active data type variable is its use in supporting string formatting (i.e., both string value setting and string value parsing), as well as its use in arithmetic expressions to identify real numbers and integers. Other practical applications of the active data type variable relate to its ability to be configured to algorithmically select the correct calibration values to be used in a test measurement software routine based on parameters such as, for example, temperature, time, etc. For example, assuming processing of the active data type variable is triggered upon reading the value of the variable, the temperature parameter value being used in the routine may be algorithmically processed to determine or select calibration values for the routine.

Generally, the use of the active data types variables of the present invention would provide a generic method that would enable users to control message-based instruments without resorting to traditional programming. By using the active data type variable, users will be able to create routines (e.g., measurement routines) that are functionally analogous to routines developed using a general purpose programming language. Moreover, the user will be able to easily generate the measurement routines themselves without having to utilize a general purpose programming language. As stated above, generating such routines by utilizing a general purpose programming language typically requires that the user write a wrapper routine, which can be tedious. Furthermore, the user would be required to know the particular programming language in order to write the wrapper routine.

The active data type variable of the present invention provides several desirable features. By causing processing of the active data type variable to occur when the variable is read, or accessed, the binding of algorithmically-defined variable values can be postponed until they are needed. This, in turn, enables the frequency with which the algorithmic processing is performed to be controlled to avoid unnecessary or undesired processing. Likewise, by causing post-processing of variable values to occur when the values change, the frequency with which the post-processing is performed can be controlled to avoid unnecessary or undesired processing.

Utilizing the active data type variable (i.e., a variable with parameters/properties that are active) enables existing software routines to be easily customized without having to resort to traditional programming. These customized versions of the software routines can be reused like (and generally will look like) any other routine. Furthermore, universal extensibility of routines independent of the implementation or language used for that routine can also be realized. Behavior extensions preferably are stored and managed with the data associated with the routine without the knowledge or cooperation of the routine being extended. In addition, the triggering of variable processing in accordance with the preferred embodiment of the present invention result in performance advantages in routines that have variables that are seldom accessed.

A description of the construction and operation of the active data type of the present invention will now be provided. Active data types in accordance with the preferred embodiment of the present invention are comprised of the following components:

(1) Zero or more extended properties stored with each active data type instance in order to control the active data type algorithms;
(2) A data type editor that knows about the active nature of the data type and exposes the extended properties for user control;
(3) The algorithms associated with the data type instance "get" and "set" operations; and
(4) A general data type management infrastructure to invoke the data editor, save and restore data type instances with associated extended properties, prepare the execution environment for active data type algorithmic processing, control access to the data instance, and invoke the algorithms on data access.

It can be seen from this description of the active data type of the present invention that active data type variables can be defined based on an arithmetic expression involving other user and system variables. These expressions preferably are invoked when the variable values are retrieved, and hence can provide the most up-to-date value for the expression. In contrast, expressions in general purpose programming languages are typically invoked once, namely, when the value of the variable is set. If the values of the variables in those expressions change, the changes are not reflected until the expression is explicitly re-executed.

In addition, active data type string formatting can be performed in accordance with the present invention to enable arbitrary parameters within the test environment to be incorporated into the message (strings) sent to instruments to control them. In the circuit-integrity-verifying program developed by Agilent Technologies Company, known as TestExecSL, these messages are sent to instruments by generic message-send and message-receive routines supplied with TestExecSL program. In accordance with the present invention, string data types used in such an environment can be made active by providing formatting control. The formatting control feature is defined by the following fundamental extended properties:

(1) Format: a string specifying the format of the string data type instance (e.g., a reference to "Variable 1" may be specified as "%Var1%"); and
(2) Format operation: the type of formatting operation associated with the string data type instance. For example, the format operation "Set String" may indicate the format to be used to calculate the value of the string. Similarly, the format operation "Scan String" may indicate the format to be used to extract subvalues from the value to which the string is set.

The underlying algorithms of the active data type variable preferably operate in a manner very similar to the manner in which the "sprintf" and the "sscanf" functions in the C programming language operate. However, the invocation of these functions is controlled in accordance with the aforementioned active data type components on access to the data instance rather than by explicit function calls. The "Set String" formatting operation occurs when any routine reads the value of the data type instance. The "Scan String" formatting operation occurs when any routines change the value of the data type instance. As stated above, the components of the active data type, such as the formatting algorithms and string data editor, enable the users of test program to control the value of the string using a set-string format or extract subvalues from the string using a scan-string format.

The following discussion of FIG. 2 provides details on active data type implementation in the circuit-integrity-verifying program. The test program provides support for the use of named symbols and parameters of a variety of types, including string data type. For the string data type, the test program supports associating a string format with any instance of a string in a manufacturing test program. This string format can either algorithmically specify the value of the string or specify how to extract portions of a changed value of the string to set the values of other symbols or parameters defined in the manufacturing test program. A string format can specify how to construct the value for a string from other symbols or parameters. A string format in accordance with the present invention may conceptually look like the string format shown in FIG. 2. In this case, the parameter has a name "Parm1" and a value of 5. The % signs are used to delimit the parameter name in the string format. For simplicity, FIG. 2 does not illustrate the algorithm associated with "Parm1" for generating the value associated therewith.

FIG. 3 demonstrates the manner in which the values of Symbols and Parameters may be set from a New String Value. A string format can specify how to extract values from portions of a new string value in order to set the values of other symbols or parameters. Therefore, when a message is returned from a test instrument, it can be parsed and symbols and/or parameters used elsewhere in the test program can be set in accordance with the values obtained during the parsing procedure. The new string format may then constitute a new message to be sent to the same or a different test instrument within the same or a different test routine, respectively. In the example shown in FIG. 3, the parameter "Parm1" is set equal to the value extracted from the new string value.

Another aspect of the present invention relates to locking and unlocking of string formatting during invocations of routines associated with the active data types. This aspect of the present invention will now be discussed with reference to the state diagram shown in FIG. 4. If a particular string parameter is accessed frequently, performing string formatting each time the string is accessed may be too slow for the particular routine being performed. It also may be disruptive for an existing routine to have the string value change dynamically while that routine runs. For both of these reasons, the test program of the present invention calculates the string value before executing a particular routine, then locks that value for the duration of that routine's execution (i.e., for that instance of the routine), regardless of the number of times the string value is retrieved. For the case where new string values set the values of other symbols or parameters, string value changes occurring during the execution of an existing routine are ignored. After that routine completes, the test program 'unlocks' the formatting, allowing the ending string value to determine the values of any symbols or parameters referenced by the format.

Figure 4:
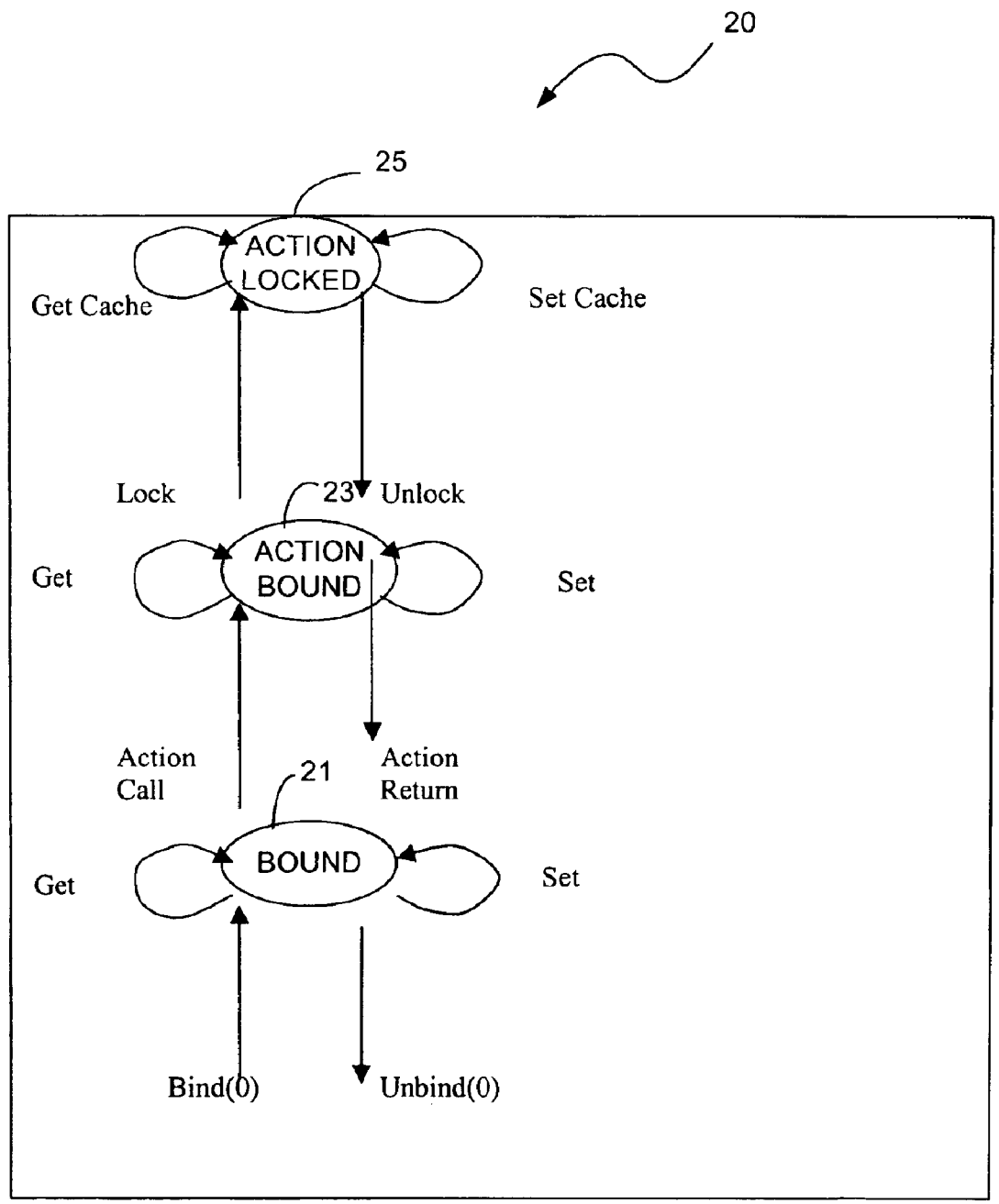
FIG. 4 is a state diagram demonstrating string formatting locking in accordance with one embodiment of the present invention.

This behavior is demonstrated by the state diagram of FIG. 4. In accordance with this diagram, the state of the string data instance starts at the 'Unbound' state (not shown), progresses to the 'Bound' state 21 as its location in memory is fixed, proceeds to the 'Action Bound' state 23 when a routine (user routine) is associated with it, and, finally, proceeds to the 'Action Locked' state 25 when the string value is fixed based on the string format, if any. The reverse state progression occurs when the Action returns control to the test program (e.g., TestExecSL). In transitioning to the 'Action Bound' state 23 from the 'Action Locked' state 25, the string value is used to calculate the values of other parameters and symbols if there is a string format and if the correct 'Scan String' format operation has been requested.

Figure 5A:
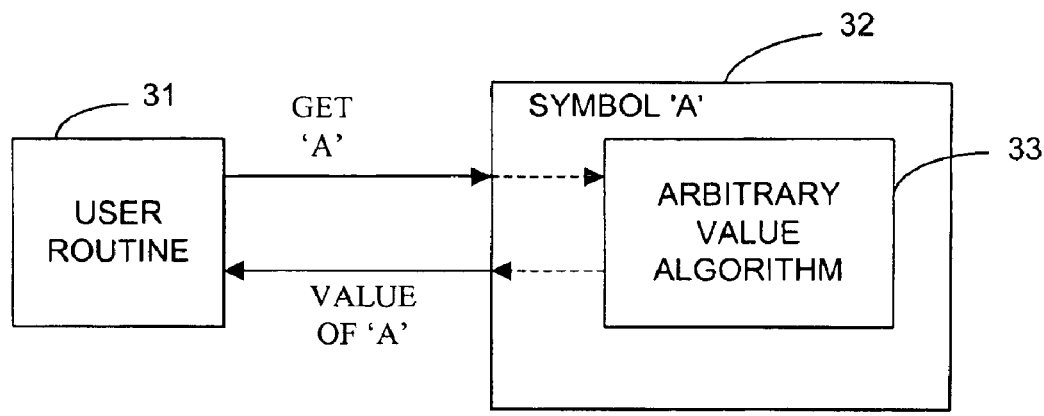
FIG. 5A is a block diagram demonstrating the manner in which an arbitrary algorithm associated with a symbol may be executed to determine the value of a symbol whenever that value is requested by some other routine.
Figure 5B:
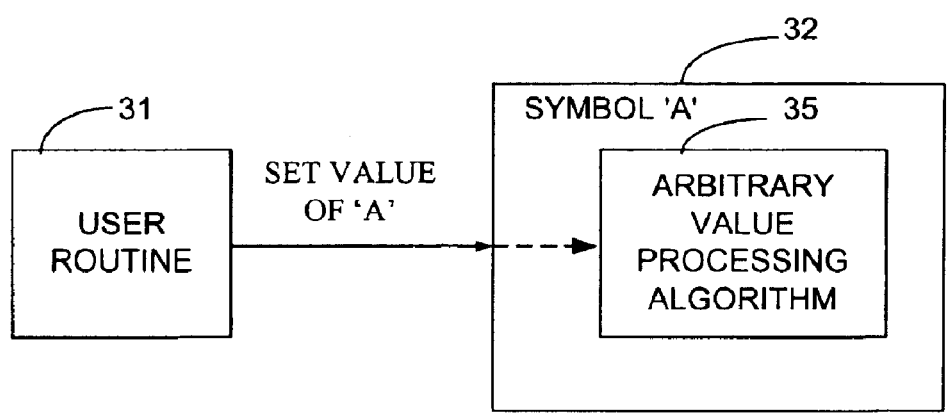
FIG. 5B is a block diagram demonstrating the manner in which an arbitrary algorithm associated with a symbol automatically processes the value of the symbol when some other routine attempts to set the value of the symbol.

While the TestExecSL implementation of the present invention makes use of active data types for string formatting only, the active data type of the present invention has more general usability, as will be understood by those skilled in the art. An arbitrary algorithm could be executed to determine the value of a symbol whenever that value is requested by other software. Similarly, an arbitrary algorithm could be executed to make use of a new value whenever the value of a symbol is set. FIG. 5A demonstrates the former general implementation of the present invention whereas FIG. 5B demonstrates the later. As shown in FIG. 5A, when a user routine 31 attempts to obtain the value of symbol "A", an arbitrary value processing algorithm 33 associated with the symbol "A" 32 is automatically executed to determine the value of the symbol. The value of the symbol is then sent to the user routine 31. As shown in FIG. 5B, when the user routine 31 sets the value of the symbol "A", an arbitrary value processing algorithm 35 associated with the symbol "A" processes the value to make use of the new value. The active data type in this case is symbol "A" and has all of the aforementioned attributes of the active data type of the present invention.

The present invention has been described with reference to particular embodiments, namely, with respect to its implementation in a circuit-integrity-verifying program environment. However, as stated above, the present invention is not limited to this particular implementation. Those skilled in the art will understand that many variations may be made to the embodiments and implementations mentioned above without deviating from the spirit and scope of the present invention.

What is claimed is:

1. A variable tangibly embodied on a computer readable medium, for use in a computer program, the computer program configured to verify the integrity of an electrical circuit, the variable comprising:
   a data type defining the size, range, and type of numerical values to which the variable is limited;
   a name enabling the computer program to identify the variable; and
   a numerical value;
   wherein the data type further comprises a first algorithm that is automatically executed when a routine of the computer program attempts to access the numerical value of the variable; and
   wherein, before the routine accesses the numerical value, the first algorithm begins processing the numerical value for providing an updated numerical value of the variable.

2. The variable of claim 1, wherein processing by the first algorithm is suspended until the routine is finished running.

3. The variable of claim 2, wherein the data type further comprises:
   a second algorithm that is automatically executed once the updated numerical value has been set, the second algorithm processing the set value to generate value processing results.

4. The variable of claim 3, wherein the setting of the value and the processing of the set value by the second algorithm is delayed until the routine returns, wherein once the routine returns, the second algorithm processes the set value to generate value processing results.

5. The variable of claim 1, wherein the data type is a parameter being utilized by the computer program.

6. The variable of claim 1, wherein the data type is a symbol being utilized by the computer program.

7. The variable of claim 1, wherein the data type is a string format being utilized by the computer program, the string format specifying a format of a string data type instance associated with the string format, the string format including a format operation, the format operation specifying an operation associated with the string data type instance.

8. A computer program apparatus for verifying the integrity of an electrical circuit, the computer program accessing a variable, the variable comprising a data type defining the size, range, and type of numerical values to which the variable is limited, the variable further comprising a name, enabling the computer program to identify the variable, and a numerical value, the computer program apparatus comprising:
   logic configured to execute at least one test routine, wherein the data type further comprises a first algorithm that is automatically executed when the at least one test routine attempts to access the numerical value of the variable; and
   logic configured to execute the first algorithm before the at least one routine accesses the numerical value, the first algorithm processing the numerical value to provide an updated numerical value of the variable.

9. The apparatus of claim 8, wherein, once the first algorithm has determined the updated numerical value, processing by the first algorithm is suspended until the test routine is finished running.

10. The apparatus of claim 9, wherein the data type further comprises a second algorithm configured to be automatically executed once the updated numerical value has been set, the second algorithm processing the set value to generate value processing results.

11. The apparatus of claim 10, wherein the setting of the value and the processing of the set value by the second algorithm is delayed until the test routine returns, and wherein once the test routine returns, the second algorithm processes the set value to generate value processing results.

12. A method for accessing a variable, the method comprising:

providing a variable, the variable having a data type defining the size, range, and type of numerical values to which the variable is limited;

naming the variable, wherein the variable name enables the computer program to identify the variable;

providing the variable with a numerical value;

incorporating a first algorithm into the data type, the first algorithm configured to automatically execute when a routine of the computer program attempts to access the numerical value of the variable;

determining when the routine attempts to access the numerical value;

executing the first algorithm to process the numerical value for providing an updated numerical value of the variable; and allowing the routine to access the updated numerical value.

13. The method of claim 12, wherein, once the first algorithm has executed to process the numerical value for providing an updated numerical value, suspending the first algorithm until the routine is finished running.

14. The method of claim 13, further comprising:

automatically executing a second algorithm when the updated numerical value is set, the second algorithm processing the set value to generate value processing results.

15. The method of claim 14, further comprising:

delaying the automatic executing the second algorithm until the routine returns.

* * * * *

UNITED STATES PATENT AND TRADEMARK OFFICE
CERTIFICATE OF CORRECTION

PATENT NO. : 6,880,148 B1
DATED : April 12, 2005
INVENTOR(S) : Raph et al.

It is certified that error appears in the above-identified patent and that said Letters Patent is hereby corrected as shown below:

Column 10,
Line 17, after "executing" insert -- of --.

Signed and Sealed this

Third Day of January, 2006

JON W. DUDAS
*Director of the United States Patent and Trademark Office*